(No Model.) 3 Sheets—Sheet 3.
L. EHRLICH.
CASH REGISTER.
No. 442,249. Patented Dec. 9, 1890.
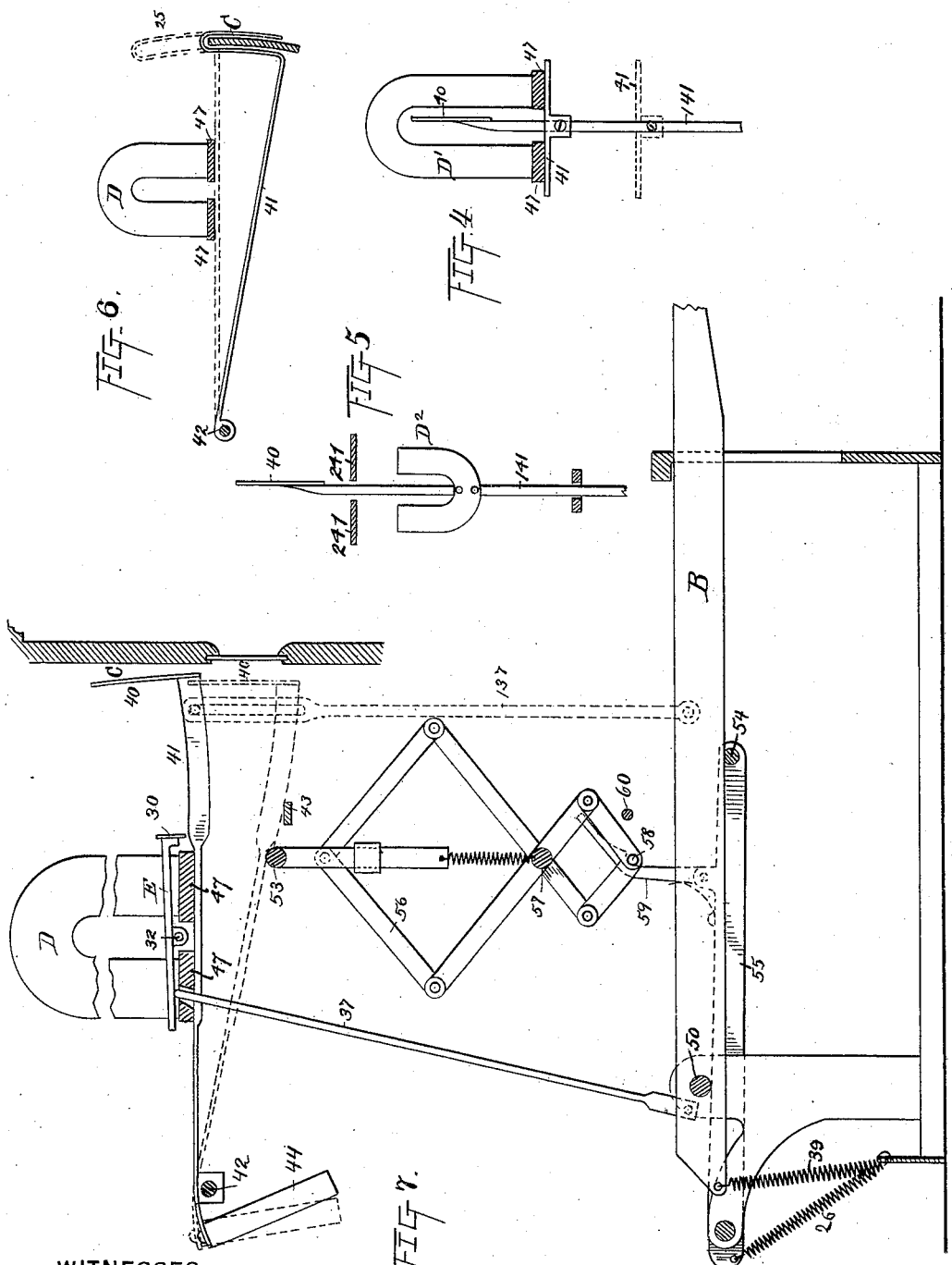
WITNESSES:
INVENTOR.

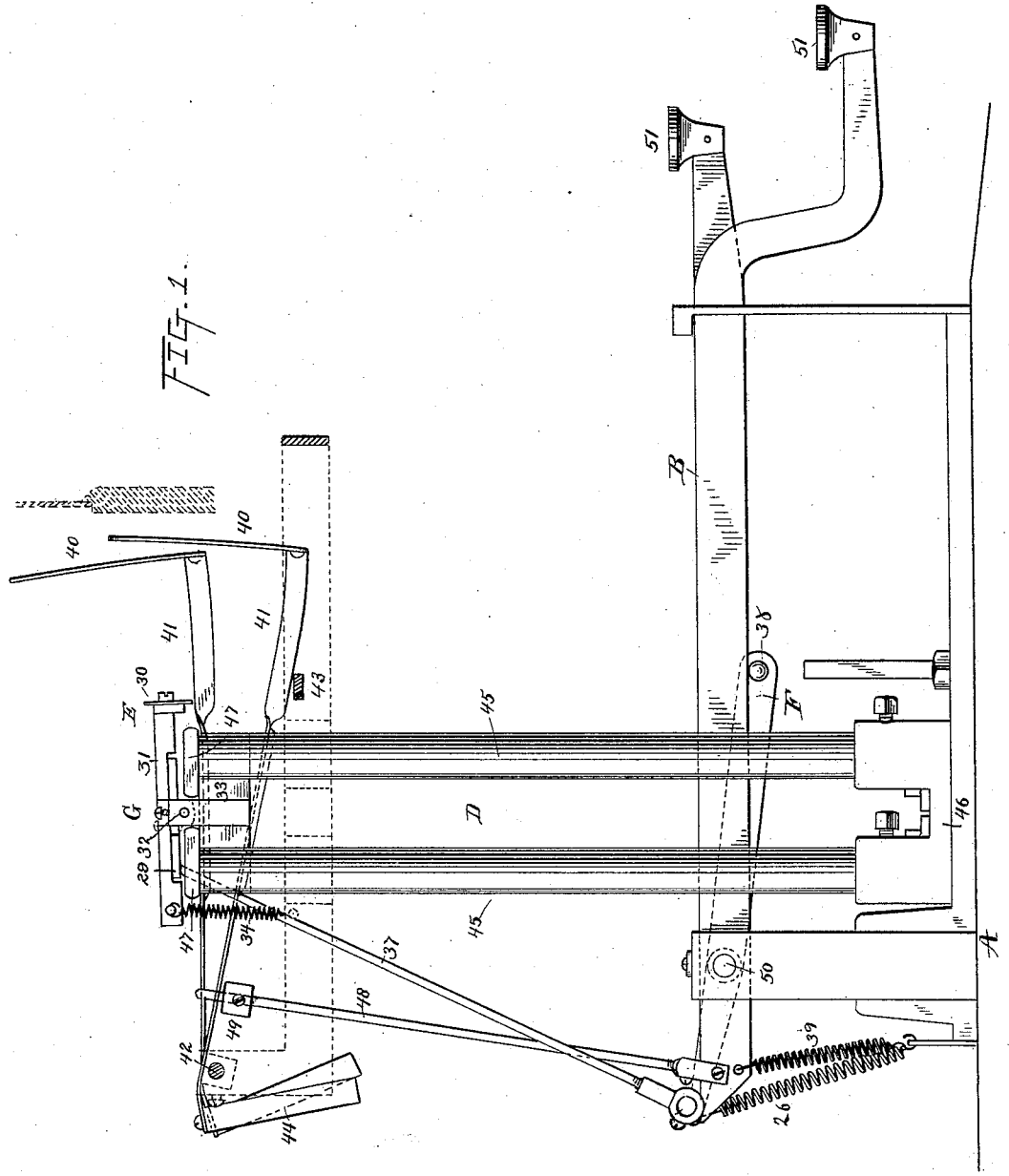

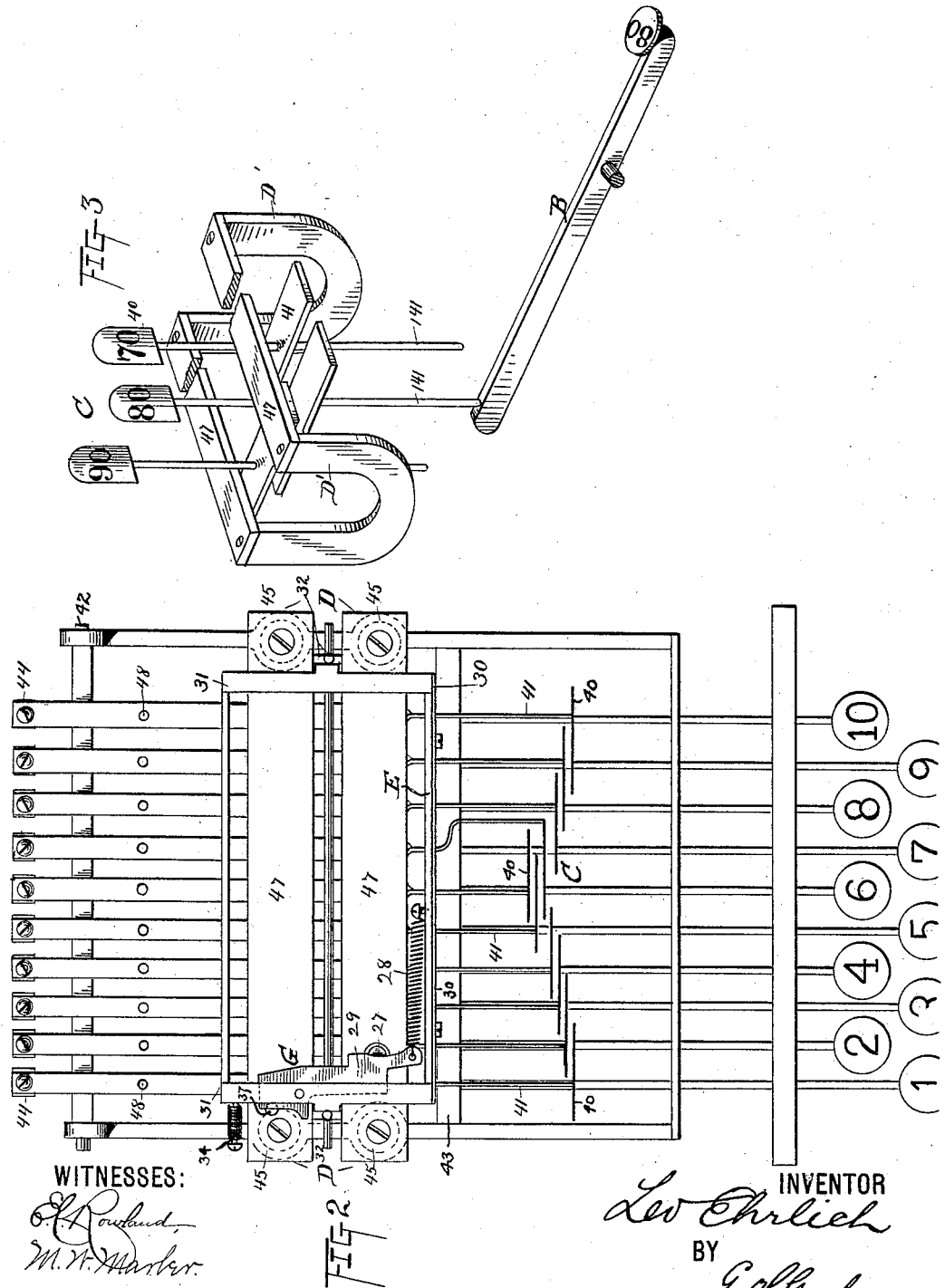

UNITED STATES PATENT OFFICE.

LEO EHRLICH, OF ST. LOUIS, MISSOURI.

CASH-REGISTER.

SPECIFICATION forming part of Letters Patent No. 442,249, dated December 9, 1890.

Application filed March 21, 1890. Serial No. 344,838. (No model.)

*To all whom it may concern:*

Be it known that I, LEO EHRLICH, a citizen of the United States, residing at St. Louis, State of Missouri, have invented certain new and useful Improvements in Cash-Registers, fully set forth in the following description and represented in the accompanying drawings.

This invention relates, generally, to registers, and more particularly to that class now commonly known as "cash-registers," although it is applicable to other classes of registers or indicators wherein it is desired to control the exhibition or exposing of an indicator or a plurality of indicators.

Heretofore in the use of indicators it has been usual to hold the indicator in its exposed position by some mechanical instrumentality co-operating with the indicator in such manner that as the indicator was moved to its exposed position said instrumentality would also be moved or its normal condition be such that it would move to sustain the indicator in such position. In some instances in common use the instrumentality has been in the shape of a wing co-operating with a plurality of indicators in such manner that its function was to sustain each of the indicators with which it was combined as they were moved to their exposed positions. In other instances each indicator has been combined with an independent instrumentality for holding it in its exposed position and for releasing it, so that it may move out of sight.

It is the object of the present invention to dispense with these mechanical instrumentalities and to provide a simple means of accomplishing the same result.

To this end the invention consists in the employment of magnetism in the form of a magnetic bar or magnet with an armature controlling an indicator in such manner that the magnet in co-operating with an armature or keeper or a plurality of armatures or keepers will control the exposing of an indicator.

In the accompanying drawings, which illustrate a practical embodiment of the invention in an indicating and registering machine, only so much of such machine is shown as will aid a complete understanding of the present invention, in which—

Figure 1 is a side elevation, partly in section, of one form of the invention. Fig. 2 is a plan view of the same. Fig. 3 is a perspective view illustrating a modified form of the mode of arranging the indicators when combined with the present improvements. Figs. 4, 5, 6, and 7 are sectional details of other modified forms of the invention.

Referring to Figs. 1 and 2 of the drawings, it will be understood that the various parts of the machine are sustained by a suitable frame-work secured to and mounted upon a base A.

As usual in registering-machines, there is provided one or a plurality of keys B, (the latter being shown,) which in the present illustration are pivoted at or near their rear ends upon a common fulcrum-rod 50, the opposite outer ends having buttons 51 arranged in banks and each bearing an indication denoting the value of its key, in the present instance said values ranging from one to ten, which may be dollars or cents or any other value or indication. No registering or counting device need be shown or described, as many forms of such devices may be used without modifying the function and operation of the improved machine, one form of device which may be readily employed in the construction shown being that set forth in Letters Patent granted to me August 21, 1888, No. 388,030. With the keys there is combined a plurality of indicators C, each of which in the present instance consists of a rectangular tablet 40— one for each key—bearing an indicating-numeral on its face or faces and secured to the front end of a rod 41, the opposite rear end being mounted upon a fulcrum-rod 42. These tablet-rods are formed of soft iron and normally rest in their unexposed position upon a bar 43. Each of the tablet-rods may be weighted at its fulcrum end by a weight 44, secured to the rod so as to not quite counterbalance the weight of the rod and its tablet.

The frame of the machine or a portion thereof may form a magnet D, consisting in the present instance of a pair of vertically-arranged steel bars 45, united together at their lower ends by a socket-plate 46, that is also secured to the base. There may be one or more of these magnets in the machine, and, as shown, there are provided two, one at each end of the machine, the upper ends of the bars 45 of each magnet being connected together by steel plates 47, running longitudinally of the machine, so that the effect of the magnets is continued along its length and forming a compound magnet of a length sufficient for the coaction of the indicators therewith. The tablet-rods 41 extend below the under surface of the magnet-plates 47 and are arranged transversely between the pairs of magnets D, the said tablet-rods forming armatures or keepers which as they are moved toward or against the magnet-plates 47 will be attracted and held thereby.

The means by which the indicators are moved upon the movement of the keys may obviously be varied within wide limits, according as the arrangement of the keys and indicators is varied. In the particular arrangement shown in Figs. 1 and 2 each of the keys is extended beyond the fulcrum-rod 50 rearwardly, and each is connected to one end of a vertically-extending connecting-rod 48, the opposite end of which is received in an opening in the tablet-rod with which it is connected. This connecting-rod carries an adjustable collar 49 in position to bear against the tablet-rod, so that upon the movement of the key in being depressed or rocked on its fulcrum and of the rod 48 its collar will raise the tablet-rod 41 into contact with or in sufficient proximity to the magnet-plates 47 so as to be attracted thereby and held in such position, with the indication upon the tablet exposed, by the magnetic attraction of the magnet or magnets D, as shown in Fig. 1. Said figure illustrates a tablet and its rod in its normal unexposed position and another tablet and its rod in its exposed position, being held in such position by the magnet or magnets D. As soon as the key has been rocked to its fullest extent, or to an extent sufficient to bring its respective tablet-rod within the attraction of the magnet, the function of the key, so far as moving the tablet to its exposed position is concerned, is ended and may be returned to its normal position under the force of a spring 39, leaving the tablet and tablet-rod in said position.

When the magnet D is a permanent one, it is desirable to provide means for moving or releasing the tablet-rods from the magnet or to move the armatures formed by said rods out of its attractive power. Thus, after the armature of one indicator has been moved within the force of the magnet and is held thereby, it is desirable that upon the movement within the attractive power of the magnet of another armature controlling another indicator to be able to move the first-named armature out of the power of the magnet, so that its indicator will be concealed from view. To this end there is provided a releaser E, that is adapted to be moved from some moving part of the machine—as, for instance, upon each movement of an armature to expose an indicator upon each movement of a key—so as to release a previous armature from the power of the magnet.

The releaser in the present instance is shown common to all of the armatures of the machine, and is arranged to be moved to release an armature each time a key is moved. It consists of a plate 30, adjustably secured to the front side of a frame 31, situated over the magnet-plates 47, and that is pivotally mounted in bearings 32, each extending from a brass cross-bar 33, secured to the under side of the magnet-plates 47. The stripper-plate 30 extends over the armatures formed by the tablet-rods, and is of a length sufficient to bear against any of them when held in position by the magnet as it is rocked for that purpose. Normally the lower or bearing edge of the stripper-plate lies above and out of contact with an armature formed when in contact with the magnet; but the range of movement of the releaser-plate is such that it will bear against and move the armature a sufficient distance from the magnet so that it will be out of its attractive power, whereupon it will drop of its own weight until the armature rests upon the bar 43. Each time the releaser is rocked to move an armature from the control of the magnet it is returned to its normal idle position by a spring 34, and when the releaser is connected to be moved by the action of the same key that moves an armature within the power of the magnet it is necessary that the releaser should have acted before that armature is within the power of the magnet, so as to be out of the way of said armature. For this purpose there is provided a lever or lever-frame F, consisting of side bars pivoted near one end upon the fulcrum-rod 50, and connected at the opposite end by a cross-bar 38, which underlies all of the keys in position to be borne upon as a key is depressed so as to rock the lever-frame. The opposite ends of the side bars are connected together by a second bar, which carries a vertically-extending rod 37, the upper end of which is in position to bear against the frame 31 of the releaser E.

In order to insure the action of the releaser and its return to its normal position, or its return to such a position that it will not interfere with the armature being moved into contact with the magnet, there is provided a tripper-connection G between the keys and the releaser, whereby during the early movement of a key the releaser will have been operated. This tripper consists of a horizontally-arranged plate 29, that is pivoted to the under side of the releaser-frame 31, so as to be capable of horizontal movement on said pivot. The rear end of the tripper-plate 29 is held normally over the end of the rod 37, so as to be borne against by said rod, upon the movement of any of the keys, by a suitable spring 28, connected at its opposite end to the releaser-frame. The forward end of said plate overlies or partially overlies or bears against an inclined projection 27, extending from the face of one of the magnet-plates 47, the spring permitting the plate to yield to pass to one side of the projection when the releaser is rocked. The construction of the parts is such that as soon as a key is moved so that the lever-frame F is rocked its connecting-rod 37 is pressed against the under side of the tripper-plate 29, which, being carried by the releaser-frame, rocks the releaser so that its plate 30 is brought into contact with an armature that may be held up by the magnet and will move the said armature away from the magnet a sufficient distance so that it will be no longer under the influence thereof. In this rocking movement of the releaser and near the end of such movement the forward portion of the tripper-plate 29 will have been pressed against the incline of the projection 27 to such an extent that it will have been vibrated horizontally against the pressure of the spring 28 sufficiently to take the rear end of said plate from contact with the end of the rod 37. As soon as this occurs the releaser, thus being suddenly unsupported, will return to its normal position under the influence of its spring 34. The movement of the key will be continued until the armature that it controls is brought under the influence of the magnet, when it may be released to return to its normal position under the influence of its spring 39. As soon as the key returns to its normal position the lever-frame F will also be returned to its normal position by its spring 26, and in returning to such position the rod 37 will also be drawn away from contact with the edge of the tripper-plate 29, so as to allow its spring 28 to return it to its normal position overlying the end of the rod, ready to be again operated in a similar way upon the movement of a key.

Instead of mounting the tablet-rods upon a pivot, the said rods may reciprocate vertically in proper bearings, as shown in Figs. 3, 4, and 5, in which figures the tablet-rods 141 bear the tablets 40 at their upper ends in such manner that when the rods and their tablets are in their lower position they are unexposed; but when raised to the high position they are brought to view, or it may be vice versa. The tablet-rods move vertically between the magnet-plates 47, which are shown as being connected to the ends of a pair of U-shaped magnets D'. Each of the rods 141 (see Fig. 3) bears an armature 41, rigidly connected thereto in such position that when a tablet-rod, its tablet, and armature are moved vertically in any of the well-known ways, so that its armature is brought within the influence of the magnet, the said tablet and its rod will be held up in the manner indicated in said figure.

In Fig. 4 the U-shaped magnet D' is arranged above the magnet-plates 47 instead of below them, as in Fig. 3. Of course it is obvious that instead of the magnet-plates 47 extending the power of the magnet longitudinally along the machine, so that a number of armatures may coact with a single or compound magnet, there may be a magnet for each armature.

In Fig. 5 there is shown a construction in which each of the tablet-rods carries a magnet $D^2$ instead of an armature, the armature 241 being fixed and perforated to form a guide for the tablet-rod.

Another form of the invention is shown in Fig. 6, resembling the construction shown in Figs. 1 and 2, with the exception that the indicating-tablet, instead of being mounted to move with the tablet-rod 41, is a fixed one, the tablet-rod carrying a guard or shield 25, that normally covers the face of the tablet, but which upon being moved against and held by the magnet, as in the device shown in Fig. 1, uncovers the indicator, so that its indication is exposed to view.

In Fig. 7 a still further modification of the invention is shown. In this construction the normal position of the armature is indicated in full lines held by the magnet with the tablets in their unexposed position, the reverse of that shown in Figs. 1 and 2. Instead of employing a releaser common to a number of armatures, there is a releaser for each armature operated by the key being moved. Thus the connecting-rod 37, instead of being moved indirectly through the medium of the lever-frame F in Fig. 1, is connected directly with the key-lever, there being of course a rod interposed between each key and each releaser E, so as to operate the latter upon each movement of the key. In such movement of the releaser the armature will be moved from under the influence of the magnet-plate D into the position shown in dotted lines, resting upon the cross-bar 43. It is obvious that in this construction the releaser may be considerably modified. Thus there may be a direct connection, as a rod 137, (see dotted lines, Fig. 7,) between each key and its respective armature or tablet-rod. The end of this connection is slotted to embrace a stud projecting from the side of the armature, so that as the key reaches or nearly reaches the limit of its movement in one direction it will positively move the armature from the influence of the magnet, the slot in said connection allowing the key to return to its normal position without disturbing the armature that it has moved.

In order to return any armature to its normal position against the magnet upon the movement of any key, there is provided a restoring-bar 53, which normally occupies a position just below the armatures, when either of them has been moved to expose a tablet. The connections between the restoring-bar 53 and the keys are such that when any key is moved the restoring-bar is moved to raise any armature back to its normal position in contact with a magnet. Many ways may be employed for moving the bar from the keys. Thus in the form shown there is provided a bar 54, that is mounted at the ends of pivoted arms 55, and underlying all of the keys, so as to be vibrated when any key is moved. The bar 53 is connected to one end of a lazy-tongs lever 56, that is pivoted at about its center upon a stud 57, with its lower end bearing a stud 58 in position to be engaged by a dog 59, carried by the bar 54 upon one of its arms 55. In the normal position of the parts shown the dog 59 is engaged with the stud at the end of the lazy-tongs lever, so that upon the movement of any key the lower portion of the lazy-tongs lever will be moved down, while the upper portion will be moved up, carrying with it the bar and any armature that it may contact with. As the key continues to move down, carrying with it the bar 54, the end of the dog 59 will be brought in contact with a fixed pin 60 in such manner that the pin will throw the dog from engagement with the stud 58, releasing the lazy-tongs lever and allowing the restoring-bar 53 to return, either by its own weight or by a spring, to its normal position, ready to restore an armature upon the next movement of a key. This connection between the bar 54 and the lazy-tongs lever and the construction of the parts are such that the restoring-bar will be raised quickly during the early movement of a key, and before the key has completed its movement, and before its tablet or armature has been moved to its exposed position, or moved from the influence of the magnet, the bar will have returned to its normal position, so as to allow the armature that may be moved by the key to reach its position without obstruction from said restoring-bar. As soon as the key returns to its normal position the dog 59 will again engage with the stud 58, ready to again move the restoring-bar in a similar manner when a key is next moved.

While the magnets described may obviously be electro-magnets having connections with a battery or other electrical generator, it is preferred to employ a permanent magnet, as its first cost and that of sustaining its attractive power are small as compared with electro-magnets.

What is claimed is—

1. The combination of an indicator, an operating-key, a magnet, an armature upon the movement of which the indicator is exposed or hidden from view, and mechanical connections between the armature and key for moving the armature within or from the attractive power of the magnet, substantially as described.

2. The combination of a plurality of indicators, a plurality of operating-keys, a magnet, a plurality of armatures, upon the movement of any of which an indicator is exposed or hidden from view, and connections between each key and armature for moving the armatures within or from the attractive power of the magnet, substantially as described.

3. The combination of an indicator, an operating-key, an armature, upon the movement of which the indicator is exposed or hidden from view, connections between the armature and key for moving the armature within the attractive power of the magnet, and a releaser under the control of the said key for moving the armature from the magnet, substantially as described.

4. The combination of a plurality of indicators, a plurality of operating-keys, a magnet, a plurality of armatures, upon the movement of each of which an indicator is exposed or hidden from view, connections between each armature and each key for moving the armatures within the attractive power of the magnet, and a releaser for moving the armatures away from the magnet, substantially as described.

5. The combination of a key, a magnet, an armature carrying an indicating-tablet, connections between the key and the armature for moving the latter within the attractive power of the magnet, and a releaser under the control of said key for moving the armature away from the magnet, substantially as described.

6. The combination of a plurality of keys, a magnet, a plurality of armatures, each bearing an indicating-tablet, connections between the keys and the armatures for moving them within the attractive power of the magnet, a releaser, and connections with the releaser common to a plurality of keys for moving the armature from the magnet, substantially as described.

7. The combination of a plurality of keys, a magnet, a plurality of armatures bearing indicating-tablets, operating connections between the keys and the armatures, a releaser, operating connections between a number of keys and the releaser, and a tripper between said connections and the releaser, substantially as described.

8. The combination of a plurality of pivoted keys, a magnet, a plurality of armatures pivoted at one end and at their opposite ends bearing indicating-tablets, connections between the keys and the armatures, a releaser for moving the armatures from the magnet, a bar common to a number of the keys, and connections between said bar and the releaser, whereby the latter is operated in advance of the movement of an armature within the attractive power of the magnet, substantially as described.

9. The combination of a plurality of keys, a magnet, a plurality of armatures bearing indicating-tablets, connections between the keys and the armatures for moving them within the attractive power of the magnet, and connections with said keys for moving the armatures away from the magnet, whereby the armature that may be held by the magnet is moved therefrom and the one operated by the key is moved within the attractive power of the magnet in succession, substantially as described.

10. The combination of a plurality of keys, a magnet, a plurality of armatures controlling indicating-tablets, a releaser operated by the movement of a key, and a tripper interposed between the releaser and the keys for causing the return of the releaser to its normal position in advance of the contact of an armature being moved by a key to the magnet, substantially as described.

11. The combination of a plurality of keys, a magnet, a plurality of armatures controlling indicating-tablets, connections between the keys and the armatures for moving them, a releaser, a tripper pivotally mounted on the releaser, and connections between the tripper and the keys, whereby the releaser is operated and returned to its normal position in advance of the movement of an armature within the attractive power of the magnet, substantially as described.

12. The combination of a plurality of keys, a magnet, a plurality of armatures pivotally mounted and counterbalanced at one end and at their opposite ends carrying indicating-tablets, and connections between the keys and the armatures for moving them within the attractive power of the magnet, substantially as described.

In testimony whereof I have set my hand, this 6th day of February, 1890, in the presence of two witnesses.

LEO EHRLICH.

Witnesses:
  GUS REIN,
  FRANCIS K. FASSETT.